Jan. 3, 1950     F. W. W. MORLEY     2,493,160
BEARINGS FOR TURBINES AND THE LIKE
Filed June 3, 1947     4 Sheets-Sheet 1

Inventor
Frederick W. W. Morley
by
Wilkinson & Mawhinney
Attorneys

Jan. 3, 1950 F. W. W. MORLEY 2,493,160
BEARINGS FOR TURBINES AND THE LIKE
Filed June 3, 1947 4 Sheets-Sheet 2

Inventor
Frederick W. W. Morley
by Wilkinson & Mawhinney
Attorneys

Jan. 3, 1950  F. W. W. MORLEY  2,493,160
BEARINGS FOR TURBINES AND THE LIKE
Filed June 3, 1947  4 Sheets-Sheet 4

Inventor
Frederick W. W. Morley
by Wilkinson & Mawhinney
Attorneys

Patented Jan. 3, 1950

2,493,160

UNITED STATES PATENT OFFICE 2,493,160

BEARING FOR TURBINES AND THE LIKE

Frederick William Walton Morley, Aston-on-Trent, England, assignor to Rolls-Royce Limited, Derby, England, a British company Application June 3, 1947, Serial No. 752,181
In Great Britain June 21, 1946

16 Claims. (Cl. 308—77)

This invention relates to bearings for turbines and the like and has for its object to provide a novel construction and arrangement whereby effective cooling of the bearing can be ensured, the construction being particularly applicable for use with the bearings of gas turbines and other machines in which high temperatures prevail.

According to this invention there is provided in a bearing for turbines and the like, the combination with the shaft, of a sleeve carrying or constituting the rotating part of the bearing secured coaxially on the shaft but having its inner surface spaced therefrom, means for admitting air to the interior of the sleeve, and conduits extending radially outward from the interior of the sleeve to extract air therefrom. The extraction is effected when the shaft is in rotation by the said conduits acting in the manner of a centrifugal pump, and when the engine is cooling when stopped after running, the conduits provide for a thermal circulation which effects a flow of air through the sleeve.

According to another feature of the invention the sleeve is provided with an outwardly directed flange on it and the conduits are formed as passages in said flange, being for example constituted by grooves or slots on the face of the flange which abuts a flange on the shaft.

According to another feature of the invention the air is admitted axially to the end of the sleeve remote from the extractor, and for this purpose the said end also has a clearance around the shaft, if it is desired to locate the said end on the shaft, this can be effected according to another feature of the invention by projections spaced around the shaft and sleeve which provide between them the necessary openings for the admission of the air. The air-supply may be derived from a stream of cooling air which is delivered for example by a fan and flows more or less axially in the space around the shaft and the stationary part of the bearing.

The accompanying drawings illustrate by way of example two constructions of bearing for a gas-turbine.

The bearing constructions illustrated are particularly suitable for turbines such as are employed in gas-turbine-engines used for aircraft propulsion purposes.

Such engines normally comprise an air compressor delivering compressed air to combustion equipment in which fuel is burnt and from which the combustion gases pass to the turbine and then from the turbine to the exhaust assembly. The compressor is drivingly connected to the turbine by a shaft which is mounted in a bearing located adjacent the turbine wheel.

It is important that this bearing be insulated from the high temperatures occurring in the combustion equipment and turbine, and since the bearing is normally located within an intermediate casing around which the combustion equipment is arranged it is necessary to deliver cooling air to the bearing. This air may be obtained by bleeding the compressor or by providing an auxiliary compressor for delivering air to within the intermediate casing.

Figure 1:
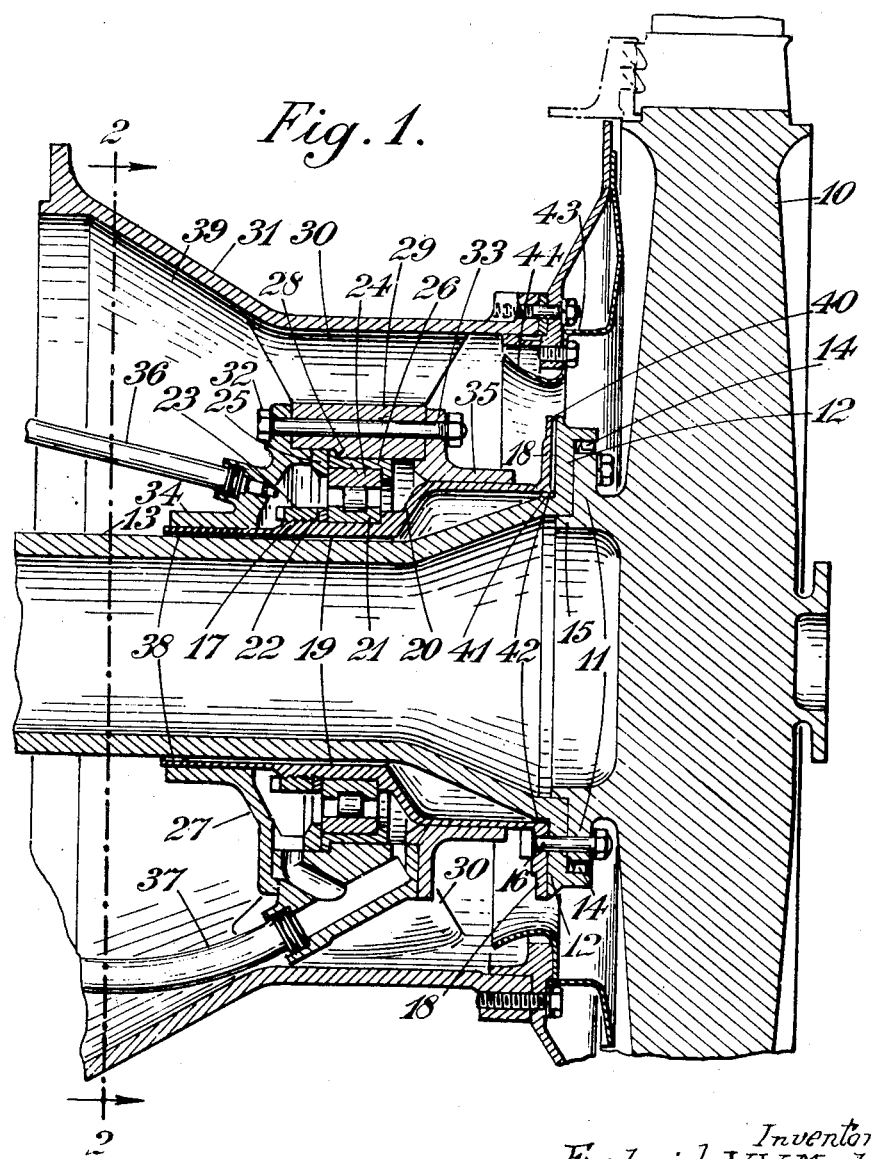
Figure 1 is a section through the axis of the turbine.
Figure 2:
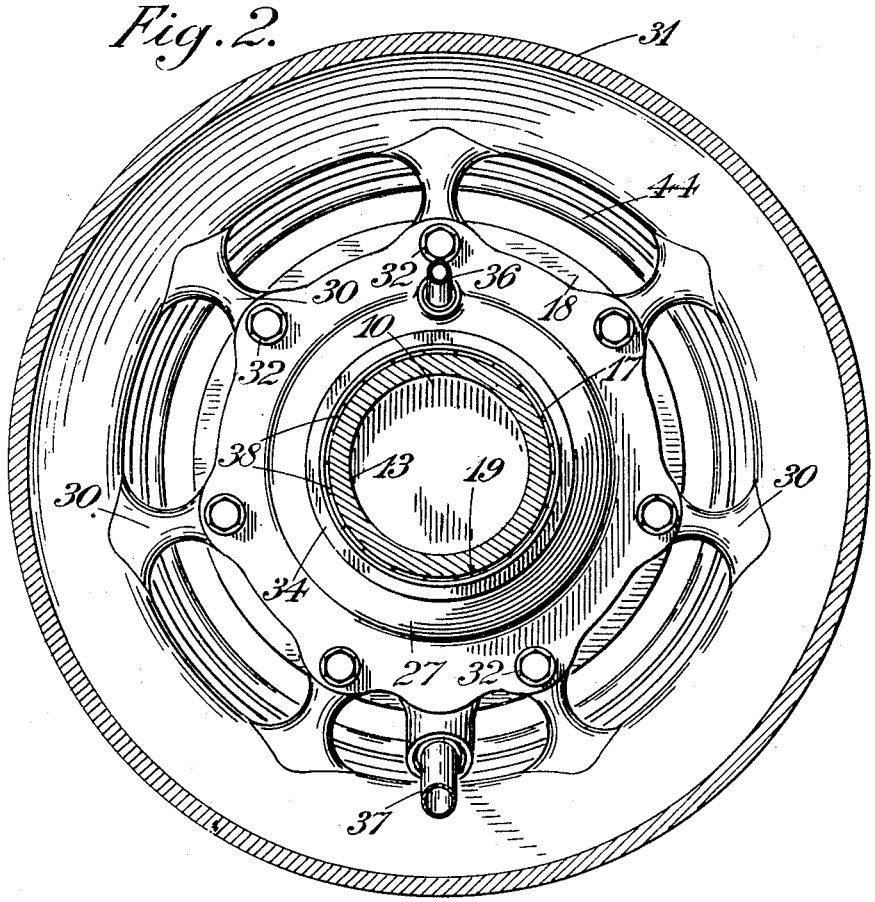
Figure 2 is a section on the line 2—2 of Figure 1.

Referring now to Figures 1 and 2 which show an improved turbine bearing construction, the turbine wheel 10 is bolted by means of a flange 11 to a flange 12 on the end of the shaft 13 by which the turbine drives the compressor. The flanges 11, 12 are formed with interengaging driving teeth 14 and the flange 11 is formed with a male spigot member 15 engaging in the end of the shaft 13 whereby the turbine wheel 10 is centralised on the shaft 13, the bolts 16 being accommodated in clearance holes in the flanges.

Mounted on the end of the shaft 13, there is a sleeve 17 having an outwardly directed flange 18 by which it is secured to the flange 12. The inner diameter of the sleeve 17 is greater than the outer diameter of the shaft 13 so as to leave an air-space 19 between the sleeve and the shaft. The outer surface of the sleeve 17 is of stepped form to provide at approximately its mid-length a shoulder 20 and seating surface for positioning the inner race 21 of the turbine bearing shown as a roller bearing, the inner race being held in position by a packing ring 22 and locking ring 23 which is threaded on the sleeve.

The outer race 24 of the bearing is retained by a packing ring 25 in a seating ring 26 which are held by a flanged retaining ring 27 against a shoulder 28 formed in an annular bearing support 29 carried by radial webs 30 extending inwardly from a section 31 of the main supporting casing of the engine. The bolts 32 by which the retaining ring 27 is secured to the bearing support 29, hold a flanged closure ring 33 in position. The flange 34 on the retaining ring 27 and the flange 35 on the closure ring form oil seals with the outer surface of the sleeve 17 so that the bearing is enclosed within an annular chamber constituted by the parts 27, 25, 26, 29 and 33, and lubricating oil is force fed to this chamber through pipe 36 and is drained from the chamber through pipe 37.

The forward end of the sleeve 17 of the shaft is formed with projecting lands 38 to spigot the forward end of the sleeve on the shaft thereby to support the forward end of the sleeve and to provide inlet openings from the space 39 to the space 19. Conveniently the channel between the lands 38 are of helical form. The sleeve is spigoted on the shaft 13 at its flanged end and radial channels 40 are formed in the face of the flange 18 which abuts the flange 12. Helical grooves 41 are formed in the sleeve seating land 42 joining the space 19 to the channels 40.

Mounted on the main casing section 31 adjacent the turbine wheel 10, there is a guide ring 43 formed with a curved flange 44 to constitute a Venturi passage for the general outflow of air from space 39, the guide ring 43 being arranged so that the channels 40 open to low-pressure region of the venturi.

In this construction, cooling air is supplied by a fan to the interior of the main casing section 31, and flows substantially axially along the casing. The air flows partly between the webs 30 to the venturi and then outwardly along the face of the turbine wheel thus cooling the outer race 24 of the bearing and its supporting structure and partly through the channels between the lands 38 into space 19 to cool the inner bearing race 21. The air flows from space 19 through grooves 41 and the ducts formed by channels 40 and the front face of flange 12. An extractor effect is obtained during running since the ducts act as a centrifugal pump thereby ensuring a continuous air flow through space 19. During cooling of the engine after running, the ducts act as thermal pumps to effect a flow of air through the sleeve 17.

The stiffness of the sleeve 17 is selected to mitigate out-of-balance effects of the turbine by allowing the turbine wheel 10 and shaft 13 to attain a self-balancing position by running out of the geometric centre and on its mass centre.

Figure 3:
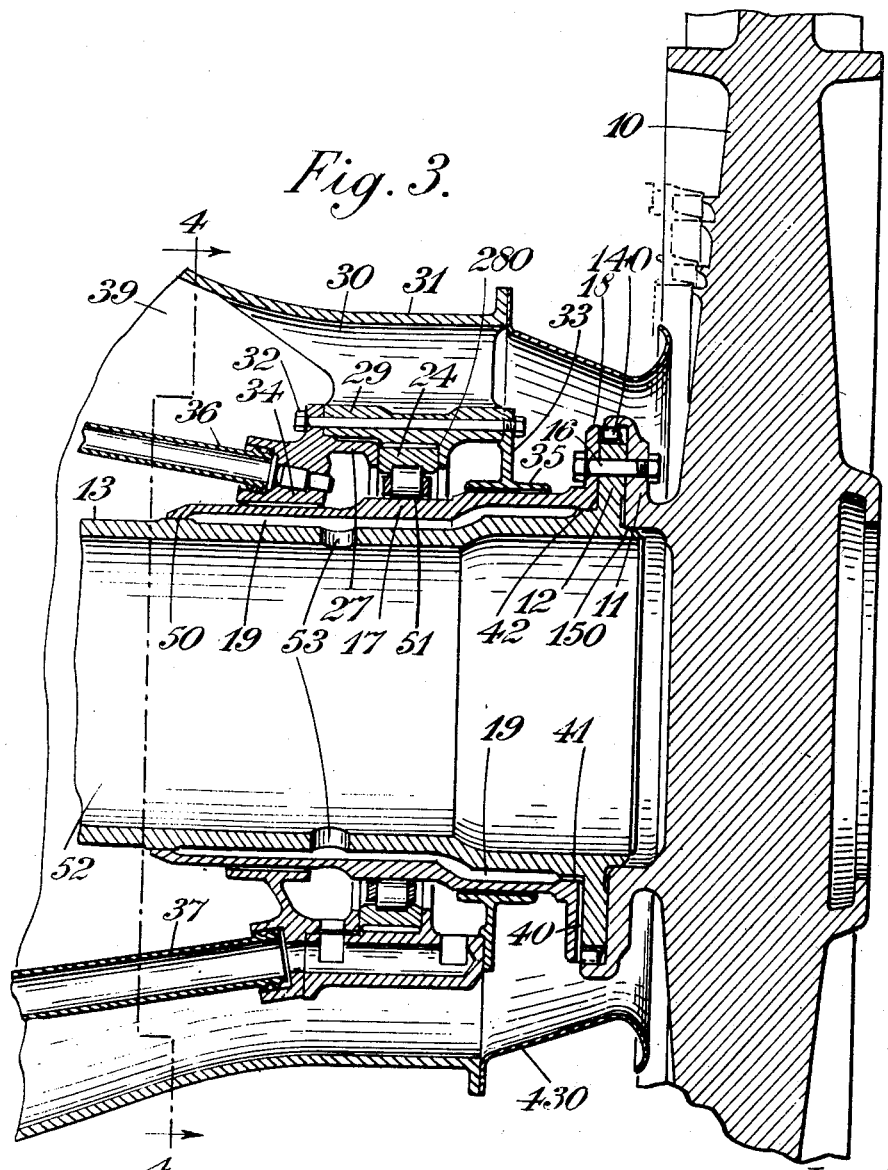
Figures 3 and 4 are corresponding views of a modified construction.
Figure 4:
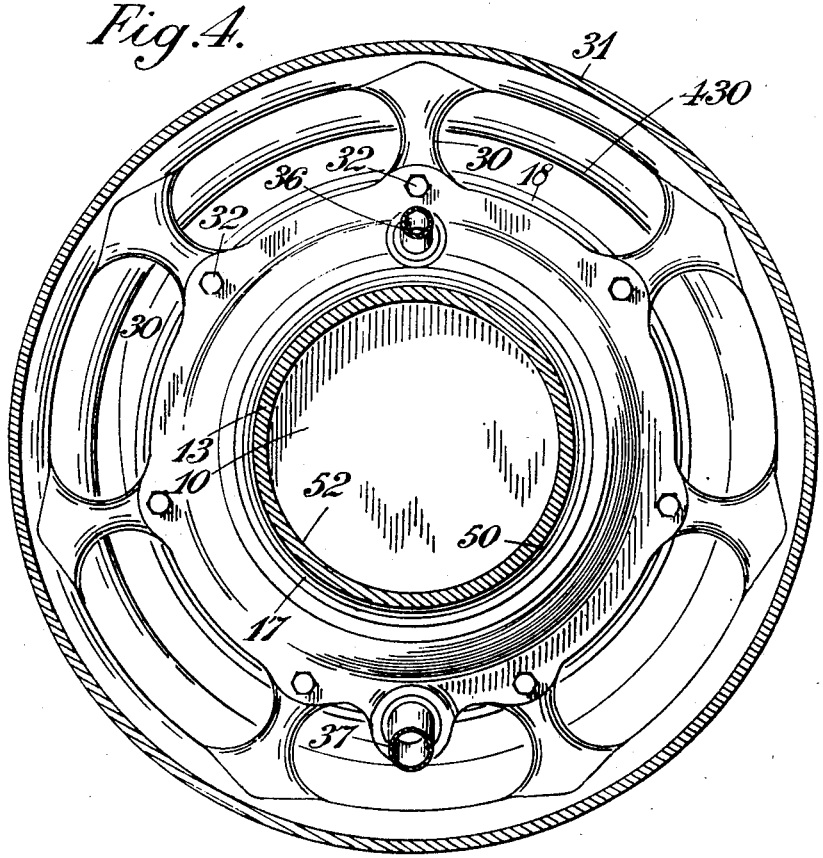

Referring now to Figures 3 and 4, in which like parts to Figures 1 and 2 are indicated by the like reference numerals, there is provided a turbine wheel 10 spigoted at 150 on the shaft 13 and secured by bolts 16 to the flange 12 on the shaft. The inter-engaging driving teeth 140 are in this case provided around the peripheries of the flanges 11, 12.

The sleeve 17 in this case is spaced from the shaft 13 substantially throughout its length and is spigoted on a seating land 42 at its flanged end and on a feature 50 at its end remote from the flange 18 to close the space 19 from space 39. Radial channels 40 are formed in the flange to open into the space 19 between the shaft and sleeve through grooves 41 in the seating land 42.

The central portion 51 of the sleeve provides the inner race of the roller bearing, the outer race 24 being held against a shoulder 280 formed on the supporting ring 29 by the retaining ring 27 and the supporting ring 29 being formed in one piece with webs 30 and the section 31 of the stationary main casing of the engine. The closure ring 33 is again provided to form a closed annular chamber to which lubricating oil is supplied through pipe 36 and from which the oil is drained by pipe 37.

In this construction, the interior 52 of the shaft 13 is placed in communication with the space 19 by holes 53 formed in the wall of the shaft and cooling air is bled off from the compressor and fed to the interior 52 of the shaft. This air flows into space 19 to cool the sleeve (and thus the inner race of the bearing) and then flows through the ducts provided by the grooves 41 and channels 40. As in the first construction a centrifugal pump effect is obtained in running to assist the flow of cooling air and a thermal pump effect is obtained during cooling after running.

At their outer ends the channels 40 open into a low-pressure region of a Venturi passage constituted by a shaped annular guide 430, cooling air also being passed to the space 39 and flowing towards the turbine wheel 10 through the guide 430 and thus cooling the outer race 24 of the turbine bearing.

The stiffness of the sleeve 17 is selected to mitigate out-of-balance effects of the turbine by allowing the turbine wheel 10 and shaft 13 to attain a self-balancing position by running out of the geometric centre and on its centre.

Without further description it is thought that the features and advantages of the invention will be readily apparent to those skilled in the art and it will be understood that changes in form, proportion and construction may be made without departing from the spirt of the invention and scope of the appended claims.

I claim:

1. A bearing for a turbine or the like, which comprises a shaft, a sleeve mounted on the shaft with its inner surface spaced from the outer surface of the shaft, said sleeve providing a rotating member for the bearing, an inlet means to admit air to the space between the sleeve and shaft, and conduits extending radially outwards from said space to air outlet means, said air outlet means being radially further from the axis of the shaft than said air inlet means.

2. A bearing for a turbine or the like comprising a shaft, an outwardly directed flange on the shaft, a sleeve providing a rotating member of the bearing mounted on the shaft with its inner surface spaced from the outer surface of the shaft, an outwardly directed flange on the sleeve abutting the flange on the shaft, air inlet means to admit air to the space between the sleeve and shaft, and conduits extending radially outwards through the flange on the sleeve from said space to air outlets radially further from the axis of said shaft than said air inlet means and providing during running an extractor to effect a flow of air through the sleeve.

3. A bearing as claimed in claim 2, wherein the said outwardly directed flange on the sleeve has channels in the surface abutting the outwardly directed flange on the shaft to provide the radial conduits.

4. A bearing for a turbine or the like as claimed in claim 3, wherein the sleeve is spigoted on the shaft adjacent the outwardly flanges and grooves are formed in the spigot surfaces to connect said space with said conduits.

5. A bearing as claimed in claim 4, wherein said grooves are of helical form.

6. A bearing for a turbine or the like comprising a shaft, a turbine wheel secured to the shaft, a sleeve mounted on the shaft adjacent the turbine wheel, said sleeve having its inner surface spaced from the outer surface of the shaft, spigot features at the end of the sleeve remote from the turbine wheel to provide air inlets to the space between the shaft and sleeve, and conduits extending radially outwards from said space and providing air outlets from said space said air outlets being radially further from the axis of the shaft than said air inlets.

7. A bearing for a turbine or the like comprising a shaft, an outwardly directed flange on the shaft, a sleeve providing a rotating member of the bearing mounted on the shaft with its inner surface spaced from the outer surface of the shaft, a flange on the sleeve abutting the flange on the shaft, means to admit air to the space between the sleeve and the shaft, conduits extending radially outwards through the flange on the sleeve from said space and providing during running an extractor to effect a flow of air through the sleeve and a guide ring providing a Venturi passage around the flanges with the low-pressure region in the region of the outlets from the conduits.

8. A bearing for a turbine or the like, comprising a shaft, a sleeve mounted on the shaft with its inner surface spaced from the outer surface of the shaft, said sleeve providing a rotating member for the bearing and having a stiffness allowing the shaft to attain a self-balancing position, air inlet means to admit air to the space between the sleeve and shaft, and conduits extending radially outwards from said space to air outlet means, said air outlet means being radially further from the axis of the shaft than said air inlet means.

9. A bearing for a turbine or the like comprising a shaft, a flange on said shaft, a sleeve mounted on said shaft and having its inner surface spaced from the shaft, a bearing race carried on the sleeve, a flange on the sleeve abutting the flange on the shaft, spigot features at the end of the sleeve remote from the flanges providing air inlets to the space between the sleeve and the shaft conduits formed in the flanges and extending radially outwards from the said space, a guide ring supported about the flange to provide a Venturi passage with its low pressure region adjacent the outlets from said conduits, a turbine wheel secured to the flange on the shaft on the side remote from said sleeve, a stationary bearing race associated with the race carried by the sleeve, stationary supporting structure supporting said stationary race and enclosing the sleeve and shaft, and means to supplying cooling air to the interior of said structure whereby an air flow is effected around said stationary race and through sleeve to cool the race carried thereon.

10. A bearing for a turbine or the like comprising a hollow shaft, a sleeve mounted on the shaft to constitute a rotating bearing member and having its inner surface spaced from the shaft, means to admit cooling air to the space between the sleeve and the shaft including ports in the shaft, and conduits extending outwardly from the said space and providing outlets for the cooling air.

11. A bearing according to claim 10 wherein a portion of the sleeve constitutes the inner race of the bearing.

12. A bearing for a turbine or the like comprising a hollow shaft, an outwardly directed flange on the shaft, a turbine wheel drivingly engaged with said flange, a sleeve spigoted at each end on the shaft to provide a closed space between the shaft and the sleeve, said sleeve constituting a rotating element of the bearing and having an outwardly directed flange abutting the flange on the shaft, conduits extending outwardly from the said space through the abutting flanges, and means to supply cooling air to the said space including ports between the interior of the shaft and said space.

13. A bearing according to claim 12 wherein said conduits are constituted by radial channels in the face of the outwardly directed flange on the sleeve which abuts the outwardly directed shaft flange.

14. A bearing according to claim 13 comprising an annular guide located about the flanges to provide a Venturi passage into a low-pressure region of which open the outlet ends of the conduits.

15. A bearing according to claim 14 comprising an outer stationary bearing race supported from stationary structure around the sleeve in line with the annular guide, means to supply cooling air to flow over the said outer race to the Venturi passage provided by the guide, means to close the outer race and inner race from the space around the bearing and means to supply lubricating fluid to said races.

16. A bearing for a turbine or the like comprising a hollow shaft, a sleeve constituting a rotating bearing element spigoted at each end on a shaft and having its inner surface spaced from the shaft, air inlet means to admit cooling air to the space between the sleeve and shaft including ports in the shaft opening the said space to the interior of the shaft and conduits extending outwardly from said space and providing air outlets, said sleeve having a stiffness allowing the shaft to attain a self-balancing position and said air inlets being radially further from the axis of the shaft than said air inlet means.

FREDERICK WILLIAM WALTON MORLEY.

REFERENCES CITED

The following references are of record in the file of this patent:

UNITED STATES PATENTS

| Number | Name | Date |
| --- | --- | --- |
| 2,423,973 | Halford | July 15, 1947 |